May 12, 1942.  L. L. WHITNEY  2,282,537
METHOD OF MAKING PIVOT MEANS
Filed Sept. 20, 1939
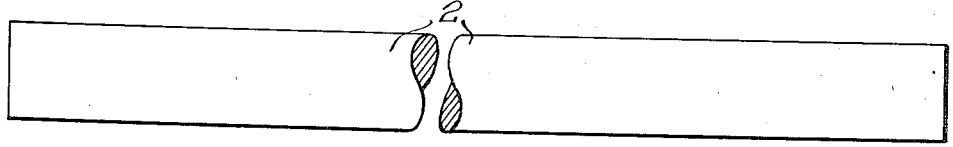
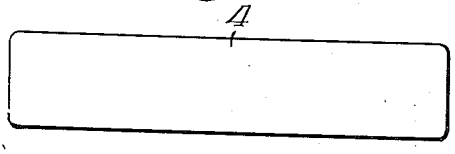
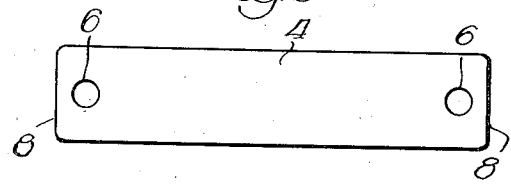
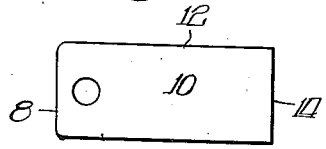
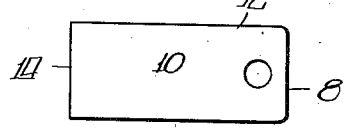
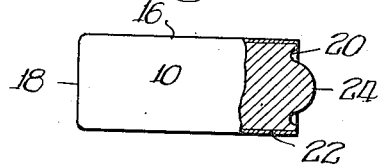
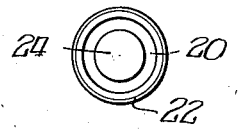
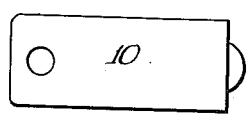
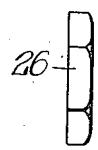
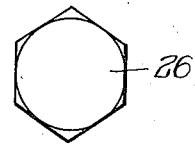
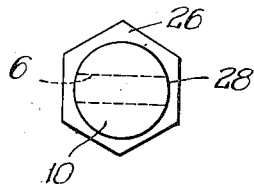
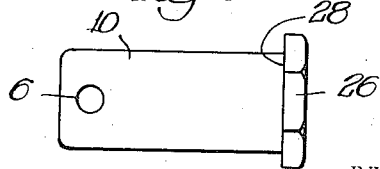
INVENTOR.
Loren L. Whitney
BY
ATTORNEY.

Patented May 12, 1942

2,282,537

UNITED STATES PATENT OFFICE 2,282,537

METHOD OF MAKING PIVOT MEANS

Loren L. Whitney, Hammond, Ind., assignor to American Steel Foundries, Chicago, Ill., a corporation of New Jersey Application September 20, 1939, Serial No. 295,749

7 Claims. (Cl. 29—148)

My invention relates to a method of making pins or pivot means used in connection with relatively movable members.

One object of my invention is to provide a method of making pins which have a hardened shank or body and a soft or unhardened head.

Another object is to provide a method whereby the welding of the pin head to the shank is accomplished in such manner that excess metal is not formed at the angle made by the juncture of the head with the shank.

A still further object is to provide a method whereby the hardened surfaces of the pin shanks may be subjected to continuous grinding, thus substantially decreasing the cost of production and facilitating the handling of the shanks in the grinding operation.

Another object is to provide a method whereby the head of the pivot member may be of relatively soft metal capable of withstanding shock without the chipping or cracking which occurs when the head is made of hard and brittle metal.

A yet further object is to provide a method of making pins whereby, after welding the head to the shank, a finished product is formed and further operations and finishing processes are unnecessary.

Figure 1 is a side view of round bar stock from which the pin shank is to be made;

Figure 2 is a view of the round bar stock cut to length for two pin shanks;

Figure 3 is a view of the cut stock with cotter holes drilled adjacent opposite ends;

Figure 4 is a view of the pin shank formed by cutting the stock in half after carburizing and represents the left half of the stock indicated in Figure 3 and Figure 4A is the same, representing the right half thereof;

Figure 5 shows the pin shank after hardening, partially in section, along the vertical longitudinal plane bisecting the shank and showing a profile of the face formed on the end and Figure 5A is a view of the end of the pin shank showing the form of the face;

Figure 6 is a view of the pin shank ready for continuous centerless grinding;

Figure 7 is a side elevation of the pin head and Figure 7A is an end view thereof;

Figure 8 is an end view of the finished pin from the shank end and Figure 8A is a side view thereof.

Describing my method in greater detail, the round bar stock 2 may be cut to the proper length 4 for two pin shanks or bodies. Two holes 6, 6 may be drilled adjacent opposite ends 8, 8 for cotter pins. After drilling the two cotter holes 6, 6, the piece 4 may be carburized by methods commonly known to those skilled in the art. After carburizing, the piece 4 is cut in half forming two pin shanks or bodies 10, 10 with carburized surfaces 12, 12, carburized ends 8, 8 and end surfaces 14, 14 which have not been carburized. The pin shanks or bodies 10, 10 are then reheated and quenched in a solution to harden the carburized surfaces 12, 12 and the carburized ends 8, 8 forming a pin shank or body 10 with a case hardened surface 16, a case hardened end 18 and an end 14 with an unhardened surface.

The soft end surface 14 of the pin shank or body 10 is forged to form an annular channel or recess 20 adjacent the outer ring of case hardened metal 22 and with a protuberance or bulge 24 formed centrally about the longitudinal axis, the contour and shape so formed being most satisfactory for the welding to follow.

The pin shank or body 10 may then be ground in a centerless grinder, continuous grinding being permitted by reason of the pin shank or body 10 being without a head. The head 26 is then blanked out in any desired form, shown here for convenience as a hexagonal head in Figures 7 and 7A. The head 26 may be welded to the pin shank 10 as at 28 in such a manner that the excess metal or flash formed by the welding operation may be forced into the annular recess 20 and thus permit a tight and accurate fit between the shank and head.

By this method the shaping of the soft end of the case hardened pin shank into the form indicated causes the excess metal created in the welding operation to be retained in the annular channel and prevents its deposit at the pin head and case hardened rim of the shank. This obviates the necessity of undercutting the head to obtain proper fitting. My method also produces a pin having long life and utility by reason of the soft and non-brittle head which will not chip or crack and simplifies and makes more efficient the grinding operation by permitting continuous centerless grinding and produces a finished product of efficient form, a hardened shank capable of rendering maximum resistance to frictional wear and affords a soft head capable of withstanding shock.

It is to be understood that I do not wish to be limited by the exact embodiments of the device shown which are merely by way of illustration and not limitation as various and other forms of the device will of course be apparent to those skilled in the art without departing from the spirit of the invention or the scope of the claims.

I claim:

1. The method of forming a pivot member with retaining means at one end thereof and having a shank with hardened wear surfaces comprising, cutting bar stock to expose an unhardened core end, upsetting the unhardened core end to form a welding contact comprising a protuberance encircled by a channel, and welding a head on said end, excess metal from said welding being retained in said channel between said head and said end.

2. The method of forming a pivot member with hardened wear surfaces and retaining means at one end thereof comprising, cutting bar stock having a hardened case to expose the unhardened core, forging on the exposed core a welding contact consisting of a protuberance surrounded by an annular recess adjacent said hardened case, and uniting a head to said member by welding and depositing flash metal in said recess.

3. The method of making a pin with hardened wear surfaces and a relatively soft head comprising, cutting to length bar stock having a hardened casing and a core, upsetting an end of the core to form a central protuberance and an annular groove therearound, and welding a relatively soft head to said end, flash metal being received in said groove during said welding operation.

4. The method of forming a pivot member with a hardened wear surface and a relatively soft head comprising, case hardening bar stock to form a relatively hard outer casing and a relatively soft inner core, exposing said soft core at an end of said member, forging a surplus of metal on said soft core with an annular channel between said surplus and said outer casing, and welding a relatively soft head to said end, said welding operation including directing excess metal into said channel for retention therein.

5. The method of forming pivot means having a shank with a hardened wear surface on a relatively soft core and having a relatively soft head for retaining means comprising, upsetting the soft core at one end of said shank to form a central knob and a surrounding channel, and welding said soft head to said knob while directing flash metal formed by said welding operation into said channel between said shank and said head.

6. The method of forming pivot means having a shank with a hardened casing and a relatively soft core and head comprising, forging the core at one end of said shank to form a central protuberance and an annular recess therearound, and welding a soft head to said end, said welding operation including the forging of excess metal from said protuberance into said recess, and so affording a tight fit between said head and said shank.

7. The method of forming a pivot member having a shank with a hardened casing and a relatively soft core and head comprising, forging on an end of said core a central protuberance and an annular groove between said casing and said protuberance, and welding a head to said end, flash metal from the welding operation being retained in said groove between said head and said end.

LOREN L. WHITNEY.